United States Patent [19]

Warren et al.

[11] 3,902,983

[45] Sept. 2, 1975

[54] METHOD AND APPARATUS FOR PREVENTING VOLTAGE EXTREMES IN AN ELECTROLYTIC CELL HAVING AUTOMATIC ADJUSTING OF THE ANODE-CATHODE SPACING

[75] Inventors: Jack Warren, Stamford, Conn.; Richard W. Ralston, Jr., Cleveland, Tenn.

[73] Assignee: Olin Corporation, New Haven, Conn.

[22] Filed: Jan. 7, 1974

[21] Appl. No.: 431,267

[52] U.S. Cl. ............................................. 204/225
[51] Int. Cl. .............................................. B23p 1/12
[58] Field of Search ............. 204/99, 128, 228, 225

[56] References Cited
UNITED STATES PATENTS

| | | | |
|---|---|---|---|
| 3,396,095 | 8/1968 | VanDiest et al. | 204/228 |
| 3,476,660 | 11/1969 | Selwa | 204/228 |
| 3,574,073 | 4/1971 | Ralston | 204/228 |
| 3,594,300 | 7/1971 | Schafer | 204/228 |
| 3,598,714 | 8/1971 | Schoberle | 204/228 |
| 3,654,118 | 4/1972 | Selwa | 204/228 |
| 3,734,848 | 5/1973 | Bertoni et al. | 204/228 |

*Primary Examiner*—R. L. Andrews
*Attorney, Agent, or Firm*—James B. Haglind; T. P. O'Day; Donald F. Clements

[57] ABSTRACT

An improved method and apparatus for protecting electrolytic cells having an automatic anode adjustment device from over- and/or undervoltages. The cell voltage is measured and displayed. Set points are established for high and/or low voltage limits and these set points are sensed by a sensing device. The sensing device is connected to the automatic anode adjustment system. When a voltage limit set point is reached, the sensing device operates to prevent further automatic anode adjustment of the cells' anodes. Electrodes are protected against voltage extremes caused, for example, by malfunctioning of components of the automatic anode adjustment device.

10 Claims, 1 Drawing Figure

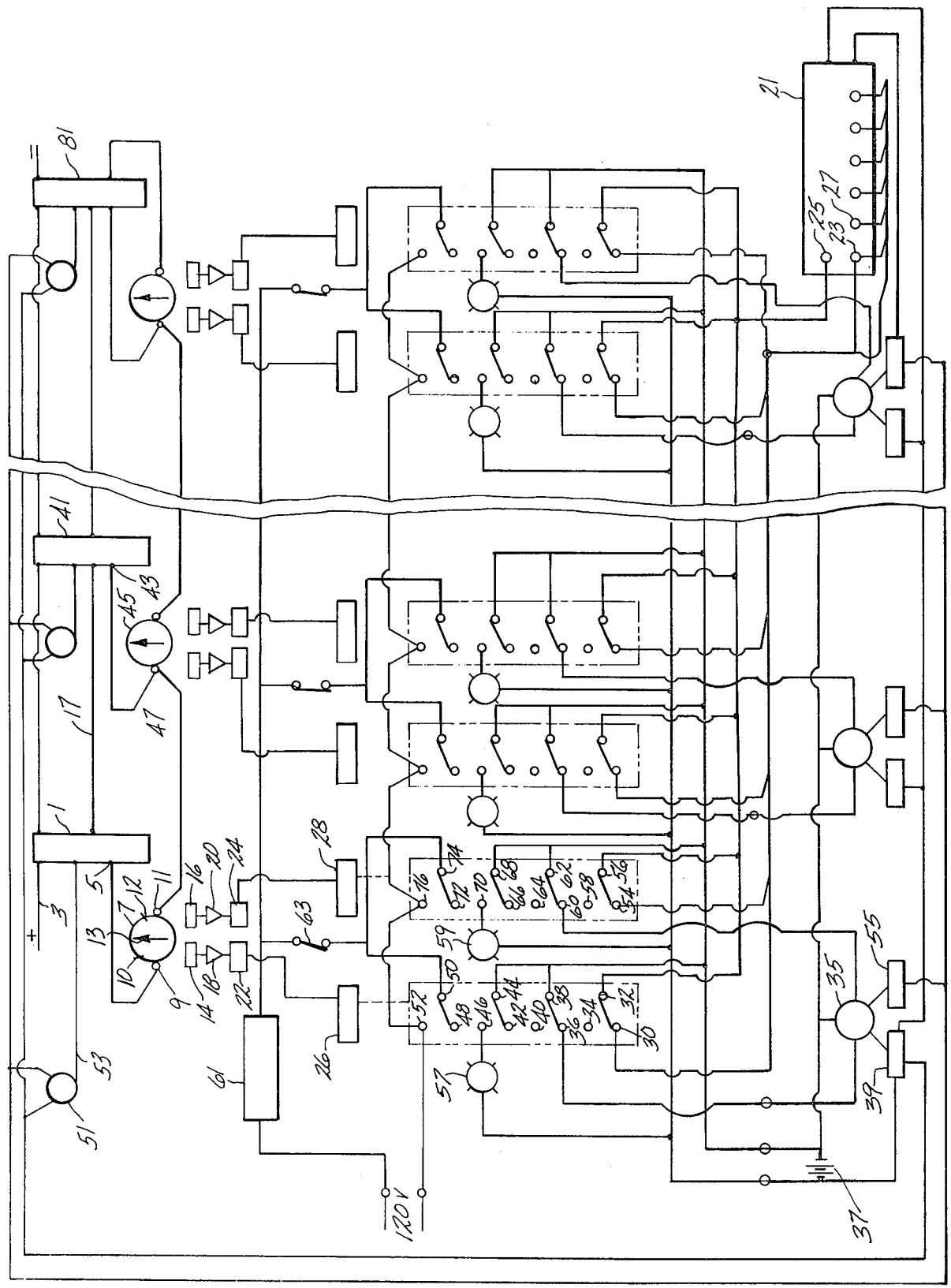

METHOD AND APPARATUS FOR PREVENTING VOLTAGE EXTREMES IN AN ELECTROLYTIC CELL HAVING AUTOMATIC ADJUSTING OF THE ANODE-CATHODE SPACING

The present invention relates to a method and apparatus for adjusting the anode-cathode spacing in an electrolytic cell. In particular, the invention relates to a new method and apparatus for detecting voltage extremes and preventing the automatic adjustment of the anode-cathode spacing in horizontal mercury cells under such conditions.

In electrolytic cells with adjustable electrodes the control of the inter-electrode distance between the anode and the cathode is economically important. The anode-cathode spacing should be as narrow as possible to maintain the voltage as close as possible to the decomposition voltage of the system being electrolyzed. A variety of methods and equipment have been employed in the control of the anode-cathode spacing, particularly in the automatic control of the anode-cathode spacing. In horizontal electrolytic cells having liquid cathodes, control of the anode-cathode spacing is usually initiated and controlled through electronic or magnetic devices.

Voltage extremes, that is over- or undervoltages, can result from several conditions in a system having automatic adjustment of the anode-cathode spacing. Automatic devices for controlling the anode-cathode spacing are subject themselves to malfunctions of various types, including, for example, broken wires, contact failures and component failures. This has been recognized in British Pat. No. 1,212,488, issued to Farbenfabriken Bayer, where an electronic scanning system is employed to locate defective switching members in a central control unit. The control unit provides automatic adjustment of the anode-cathode spacing in an electrolytic cell. The end result of an equipment malfunction may be the operation of the cell outside of the desired voltage range. Where an equipment malfunction permits a voltage overload to occur, the energy discharged may be sufficient to overheat or boil the electrolyte being decomposed. On the other hand, if an equipment malfunction permits a voltage underload to take place, short circuiting is the result. When this occurs, heavy and costly damage may be done to the anodes in the cell.

In addition to the malfunction of equipment, other conditions can arise where the cell incurs an overvoltage or undervoltage related to the automatic adjustment of anodes.

The current in a horizontal mercury electrolytic cell is distributed to the anodes in the cell thru a circuit connected in parallel. Where the cell has an automatic anode adjustment device responsive to high current in an anode, when the high current limit is reached the anode is raised. Usually the anode is raised until its current level falls below the high current limit. As the anode is raised, the excess current received by the anode is distributed among the other anodes in the cell. Should this distribution of current cause the high current limit of another anode to be exceeded, it will also be automatically raised and its current excess distributed among the remaining anodes. Thus a "domino" or "cascading" effect may occur where the distribution of current to the remaining anodes triggers the automatic raising of additional anodes until the cell receives an overvoltage.

It is the object of the method and apparatus of the present invention to continuously detect voltage extremes and under such conditions prevent automatic adjustment of the anode-cathode spacing in electrolytic cells having a liquid cathode.

An additional object of the method and apparatus of the present invention is the prevention of maladjustment of the anode-cathode spacing in a horizontal mercury cell when a malfunction occurs in the automatic adjustment system.

These and other objects of the invention will be apparent from the following description of the invention.

The novel method of this invention protects against overvoltages or undervoltages in an electrolytic cell containing an electrolyte decomposable by electric current where the electrolyte is in contact with electrodes. The electrodes are comprised of at least one adjustable anode and a liquid cathode in spaced relationship. An automatic adjustment system controls the vertical movement of the adjustable anode. A voltage is applied to the anode and to the cathode to effect decomposition of the electrolyte.

The improved method of this invention comprises:
a. measuring the voltage of the cell,
b. displaying the voltage,
c. selecting a voltage limit on the display,
d. connecting a sensor to the voltage limit,
e. connecting the automatic adjustment system to the sensor,
f. sensing the voltage limit, and
g. preventing automatic adjustment of the anode when the voltage limit is exceeded.

The novel apparatus of the present invention is illustrated in the accompanying FIGURE.

The accompanying FIGURE represents the circuit for protecting anodes from voltage overloads or underloads employing the method and apparatus of the present invention. Electrolytic cell 1 contains a plurality of adjustable anodes (not shown). Current is supplied by conductor 3 to the anode conductors (not shown) along cell 1. Terminal 5 connects cell 1 with contact 9 of voltmeter 7. Adjacent cell 41 receives current thru conductor 17 attached to the cathode (not shown) of cell 1. Terminal 43 along anode conductors (not shown) of cell 41, connects cell 41 with contact 47 of volmeter 45. Contact 47 is also connected with contact 11 of voltmeter 7 and completes the circuit for measuring the voltage of cell 1. Needle 13 indicates the voltage across cell 1 on voltmeter 7. Set point 10 is established as the low voltage limit, and set point 12 as the high voltage limit for cell 1. Photoelectric sensor 14 senses low voltage set point 10 and photoelectric sensor 16 senses high voltage set point 12. Under normal operating conditions, photoelectric sensors 14 and 16 are illuminated by a light source and produce a current. Amplifier 18 receives current from photoelectric sensor 14 and supplies an amplified current to inverting relay 22. A contact for inverting relay 22 is connected to the coil of relay 26 having contacts shown at terminals 30, 32, 34, 36, 38, 40, 42, 44, 46, 48, 50 and 52. Similarly, photoelectric sensor 16, when illuminated, supplies a current to amplifier 20 and the amplified current is transmitted to inverting relay 24. A contact of inverting relay 24 is connected to the coil of relay 28, having contacts shown at terminals 54, 56, 58, 60, 62, 64, 66, 68, 70, 72, 74 and 76. Terminals 30 and 54 are connected to terminals 23 and 27, respectively, of automatic anode adjuster 21. Similarly connected are corresponding terminals on relays to cells 41 and 81. Terminal 32 connected to terminal 25 of automatic anode adjustor 21. Terminal 25 is also connected to terminal 56 of relay 28 and to corresponding terminals on relays to cells 41 and 81. Terminal 36 is connected to protective device 35 which is in turn connected to lower relay 39. Lower relay 39 is connected to the lower winding of motor 51 and to power supply 37. When the lower winding of motor 51 is energized, the anodes of cell 1 are lowered via mechanical connection 53. Similarly, terminal 60 is connected to protective device 35 which is connected to raise relay 55. A contact of raise relay 55, energizes the raise winding of motor 51, which when energized, raises the anodes of cell 1. Power supply 37 provides current to terminals 38 and 44 and 62 and 68. Lamp 57 is connected to terminal 46 and power supply 37 while lamp 59 is connected to terminal 70 and power supply 37.

Alarm 61 is energized thru a 120 volt power source (not shown) and is connected thru switch 63 to terminals 50 and 74. Power is supplied to terminals 52 and 76 from the 120 volt power source. When needle 13 falls to or below low voltage set point 10, the light beam to photo device 14 is interrupted, reducing the current level to where it no longer energizes inverting relay 22. Output relay 26 is then energized and contact is broken between terminals 30 and 32. This inactivates automatic anode adjustor 21 and prevents it from lowering the anodes in cell 1. Simultaneously, contact is broken between terminals 36 and 38, inactivating protective device 35 and preventing it from lowering the anodes of cell 1. To alert plant personnel that automatic anode adjustor has been inactivated, alarm 61 is sounded by the closing of a contact between terminals 50 and 52. To specifically indicate that cell 1 is the cell involved, lamp 57 is lit as contact is made between terminals 44 and 46. Similarly, when needle 13 reaches or exceeds high voltage set point 12, automatic anode adjustor 21 is inactivated by breaking the contact between terminals 54 and 56. This inactivation prevents automatic anode adjustor 21 from raising the anodes in cell 1. The energizing of output relay 28 breaks the contact between terminals 60 and 62 and protective device 35 can no longer energize raise relay 55, thus preventing motor 51 from raising the anodes of cell 1. Lamp 59 is turned on by making contact between terminals 68 and 70 and alarm 61 is set off when the contact between terminals 74 and 76 is closed. Other cells in the series are removed from automatic anode adjustment in the same manner.

In the accompanying FIGURE protective device 35 and automatic anode adjustor 21 are simultaneously inactivated. However, it will be readily apparent that the inactivation of protective device 35 can be made independent of that of automatic anode adjustor 21. In addition, the method and apparatus of the present invention are suitably used in an automatic anode adjustment system employing either protective device 35 or automatic anode adjustor 21. Similarly, it will be recognized that in selecting a voltage limit for the display a high voltage limit or a low voltage limit or, as shown in the accompanying FIGURE, both may be used in the practice of the present invention.

The cell voltage may be measured in any convenient manner. For example, the cell voltage, may be obtained by attaching a first lead to a conductor supplying current to the anodes in a first cell. While any conductor may be used, it is preferred to attach the first lead to a conductor supplying current to anodes located at the center of the cell. The first lead is also attached to a voltage display device for the cell.

A second lead is attached to a conductor serving the cathode of the first cell and can be located at any convenient place on the conductor. This second lead is also attached to an anode conductor on a second adjacent cell. While it can be placed at any convenient location, it is preferable to attach the second lead to the conductor in the position corresponding to that of the first lead. The second lead is also attached to the voltage display device for the second cell. A lead attached to the voltage display device for the first cell and connected to a contact on the voltage display device of the second cell completes the circuit. The voltage of the first cell in thus supplied to the first voltage display device.

The measured cell voltage is displayed on a voltmeter having means for establishing at least one set point as limiting value. The voltage limit can be set, for example, by means of an indicator or dial setting.

Set points selected for the high or low voltage limits will depend, for example, on the decomposition voltage range of the electrolyte in the cell and the type of electrodes used. In a horizontal mercury cell, where the electrolyte is an alkali metal chloride such as sodium chloride, the high voltage limit is a range from about 5 to about 7, and preferably from about 6 to about 6.5. The low voltage limit for this electrolyte is from about 1 to about 3.5 and preferably from about 2.5 to about 3.5.

Having established a set point for low and/or high voltages, the method and apparatus of the present invention employs means for sensing the voltage limits. While any suitable means can be employed, it is preferred to use a contactless type of sensor such as a photoelectric, inductive or capacitive sensor. In one embodiment of the present invention, a control meter relay is utilized which combines the voltage display and set point means with a sensing device. A suitable example is that of U.S. Pat. No. 3,588,516, issued June 28, 1971 to J. S. Friedman. This meter relay has at least one set point which is sensed photoelectrically by a beam from a light source passing thru the set point to a photocell. While illuminated, the photocell produces a current. When the light beam is broken, for example, by an indicator reaching or exceeding the set point, the current produced is considerably reduced or eliminated.

In the method and apparatus of the present invention, the sensing device for the high and low voltage set points is connected to an automatic anode adjusting apparatus. The method and apparatus of the present invention may be employed with automatic anode adjustment systems of the operational and/or protective type. Operational systems are those which utilize automatic anode adjusting apparatus to continually maintain the anode-cathode spacing within normal operating limits. In operational systems the voltage for the electrolyte being decomposed is therefore held near the optimum value. Typical examples of these systems include those described in U.S. Pat. Nos. 3,531,392, issued Sept. 29, 1970 and 3,627,666, issued Dec. 14, 1971.

Protective systems are those employing automatic anode adjustment apparatus to prevent damage to cell components from current or voltage extremes. U.S. Pat. Nos. 3,574,073, issued Apr. 6, 1971, 3,558,454, issued Jan. 26, 1971, and 3,723,285, issued Mar. 27, 1973 are suitable examples of protective systems. The method and apparatus of the present invention is particularly suitable for use with the anode adjustment method of U.S. Pat. No. 3,574,073, wherein a current protective device is responsive to changes in the flux of the magnetic field generated by current flow in a conductor supplying the anodes. The current protective device controls the opening and closing of an electrical circuit, which activates a motor effective to raise or lower the anodes. While these devices employing magnetic means, such as a reed switch, for current overload or underload detection are generally satisfactory, they are physically located on the electrical conductors of the electrolytic cell. They are therefore subject to the influence of stray magnetic fields, heat and corrosion. For example, a reed switch is calibrated to energize a motor to raise the anodes of a cell when the current to the anodes reaches a predetermined upper level. When the current to the anodes reaches the predetermined upper level, the reed switch closes and energizes a motor to raise the anodes. Raising of the anodes continues until the current falls below the predetermined upper level, at which point the reed switch opens and stops anode movement. Should the reed switch fail to open, for example, because of corroded contact points, excessive raising of the anodes will be prevented by the method and apparatus of the present invention. Using the method and apparatus of the present invention having a set point for high voltage, when the high voltage limit is reached, the reed switch is inactivated. In addition, an alarm device is set off to warn an operator that a malfunction in the current protective device has taken place and components in the cell are in danger of being damaged.

A further example of a protective device suitable for use with the method and apparatus of the present invention is the electronic bus overcurrent and undercurrent switch of application Ser. No. 359,152, filed May 10, 1973, by Jack Warren. This application describes an electronic device which detects current changes in a conductor supplying current to the anodes of a horizontal mercury cell. When the current exceeds an upper reference signal the device energizes a motor to raise the anodes; when the current falls below a lower reference signal, the electronic device energizes a motor to lower the anodes. Should a component malfunction occur in the device of application Ser. No. 359,156, the method and apparatus of the present invention would prevent excessive raising or lowering of anodes by the electronic device.

The method and apparatus of the present invention can also be employed where the anode adjustment system utilizes a digital computer to regulate the anode-cathode spacing. Whenever the set point for high or low voltage is attained on a cell, the present invention inactivates the automatic anode adjustor and energizes an audio or visual alarm system.

Although the invention is particularly useful in the operation of horizontal mercury cells used in the electrolysis of alkali metal chloride brines, it is generally useful for any liquid cathode type electrolytic cell having an automatic adjustment system for the anodecathode spacing.

The number of electrolytic cells controlled by the method and apparatus of this invention is not critical. Although a single electrolytic cell can be controlled, commercial installations containing more than 100 cells can be successfully controlled.

The method and apparatus of the present invention may be used in electrolytic cells where the anodes automatically adjusted are of various materials. For example, graphite or metal anodes may be employed. Particularly suitable are anodes of a valve metal such as titanium or tantalum being at least partially coated with a thin layer of platinum metal. The term "platinum metal" includes an element of the group consisting of ruthenium, rhodium, palladium, osmium, iridium and platinum or alloys of two or more of these metals or oxides thereof.

What is claimed is:

1. In a method for protecting electrodes from overvoltages or undervoltages caused by the malfunction of an automatic anode adjustment system in an electrolytic cell containing an electrolyte decomposable by electric current where the electrolyte is in contact with electrodes, said electrodes being comprised of at least one adjustable anode and a liquid cathode in spaced relationship, an automatic adjustment system for vertical movement of said adjustable anode, and a voltage being applied to said adjustable anode and said cathode to effect decomposition of said electrolyte, the improvement which comprises:
   a. measuring said voltage of said cell,
   b. displaying said voltage of said cell,
   c. selecting a voltage limit on said display,
   d. sensing said voltage limit by a contactless sensor,
   e. connecting said automatic anode adjustment system to said contactless sensor, and
   f. preventing automatic adjustment of said anode when said voltage limit is exceeded.

2. The method of claim 1 in which said voltage limit is a high voltage limit.

3. The method of claim 1 in which said voltage limit is a low voltage limit.

4. The method of claim 1 in which said voltage limit is a high voltage limit and a low voltage limit.

5. The method of claim 1 in which said exceeding of said voltage limit results in activating an alarm.

6. An apparatus for protecting electrodes from overvoltages or undervoltages caused by the malfunction of an automatic anode adjustment system in an electrolytic cell containing an electrolyte decomposable by electric current where the electrolyte is in contact with electrodes, said electrodes being comprised of at least one adjustable anode and a liquid cathode in spaced relationship, an automatic adjustment system for vertical movement of said adjustable anode, and a voltage being applied to said adjustable anode and said cathode to effect decomposition of said electrolyte, said apparatus comprising in combination:
   a. means for measuring a voltage signal between said anode and said cathode of said cell,
   b. means for displaying said voltage signal,
   c. means for selecting a voltage limit on said display,
   d. means for contactless sensing of said voltage limit,
   e. means for automatically adjusting said space between said electrodes, f. means for connecting said contactless sensing means to an automatic adjustment means, and g. means for preventing said automatic adjusting means from adjusting said anode when said voltage limit is exceeded.

7. The apparatus of claim 6 wherein said sensor is a photoelectric device.

8. The apparatus of claim 7 wherein said automatic adjustment means is a current activated device.

9. The apparatus of claim 8 wherein said current activated device is a reed switch.

10. The apparatus of claim 8 wherein said current activated device is an electronic bus overcurrent and undercurrent switch.

* * * * *